S. D. Edgar.
Churn.
N° 88,148.      Patented Mar. 23, 1869.
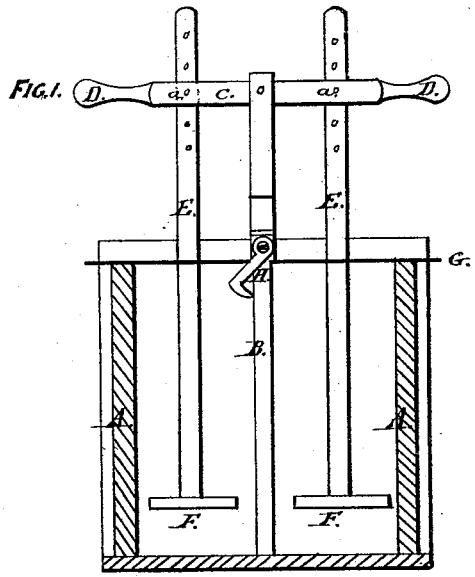
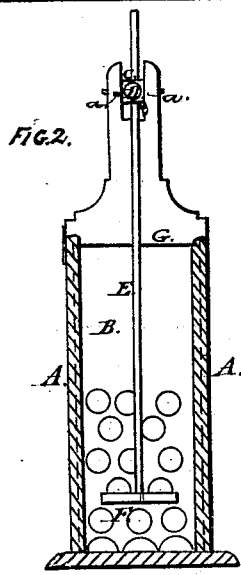
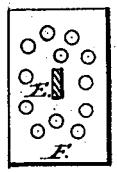
WITNESSES:
Cornelius Cox
Leopold Everh
INVENTOR:
Saml. D. Edgar
per
Alexander F. Mason
attorneys

SAMUEL D. EDGAR, OF DAYTON, OHIO.

Letters Patent No. 88,148, dated March 23, 1869.

IMPROVEMENT IN CHURNS.

The Schedule referred to in these Letters Patent and making part of the same.

*To all whom it may concern:*

Be it known that I, SAMUEL D. EDGAR, of Dayton, in the county of Montgomery, and in the State of Ohio, have invented certain new and useful Improvements in Churns; and do hereby declare that the following is a full, clear, and exact description thereof, reference being had to the accompanying drawings, and to the letters of reference marked thereon.

The nature of my invention consists in the construction of a churn, by which butter can be made with less trouble and in shorter time than in those now in use.

In order to enable others skilled in the art to which my invention appertains, to make and use the same, I will now proceed to describe its construction and operation, referring to the annexed drawings, which form a part of this specification, and in which—

Figure 1 is a side elevation in section,

Figure 2, an end view in section, and

Figure 3, a plan view of the dasher.

A represents a rectangular box, of suitable dimensions, which is divided into two compartments, by means of the partition B.

The partition B fits into vertical grooves on the inside of the sides of the box A, so that it can be easily removed and put in at pleasure.

It also extends above the box A, its upper end being divided, or forked, as shown in fig. 2.

In this upper forked end of the partition B, is pivoted a lever, C, the ends of which form handles D D, by which the churn is worked.

The lever c is, at suitable points on each side of the partition B, slotted, and in these slots the bars E E are pivoted. These bars can be raised or lowered at will in said slots, and secured by pins *a a*, the bars being provided with a series of holes for that purpose.

The bars E E extend downward, one in each of the compartments of the churn, and to the lower ends of said bars, the dashers F F are secured.

The dasher F consists merely of a perforated board, as seen in fig 3.

The lower part of the partition B is also perforated by a number of holes, as seen in fig. 2.

The churn is closed by two lids, *g g*, inserted from the ends, into horizontal grooves on the sides of the box A, the end-pieces of said box being, for that purpose, made lower than the sides.

The partition B, when inserted into the box A, is held by a hook, H, or other suitable means.

By arranging a churn as above described, the milk is kept in a perfect and even motion all the time. There are three distinct motions at the same time, viz, the downward motion of the dasher on one side, the passing of the milk through the holes in the partition, and the elevating with the dasher on the opposite side. Consequently a very violent motion is imparted to the milk, with little trouble, and butter is obtained in a short space of time.

Having thus fully described my invention,

What I claim as new, and desire to secure by Letters Patent is—

The arrangement of the perforated partition B, when extending above the box A, so as to form a fulcrum for the horizontal lever C, in combination with the dasher-shafts E E, and the slotted sliding lids G G, all substantially as herein specified.

In testimony that I claim the foregoing, I have hereunto set my hand, this 14th day of October, 1868.

SAML. D. EDGAR.

Witnesses:
 THS. D. MITCHELL,
 GEORGE P. GEBHART.